Dec. 22, 1970 R. S. PENLAND 3,549,985
METAL DETECTING DEVICE HAVING A DISK-SHAPED HEAD
FOR HOUSING A COIL SYSTEM
Filed Feb. 27, 1969 2 Sheets-Sheet 1
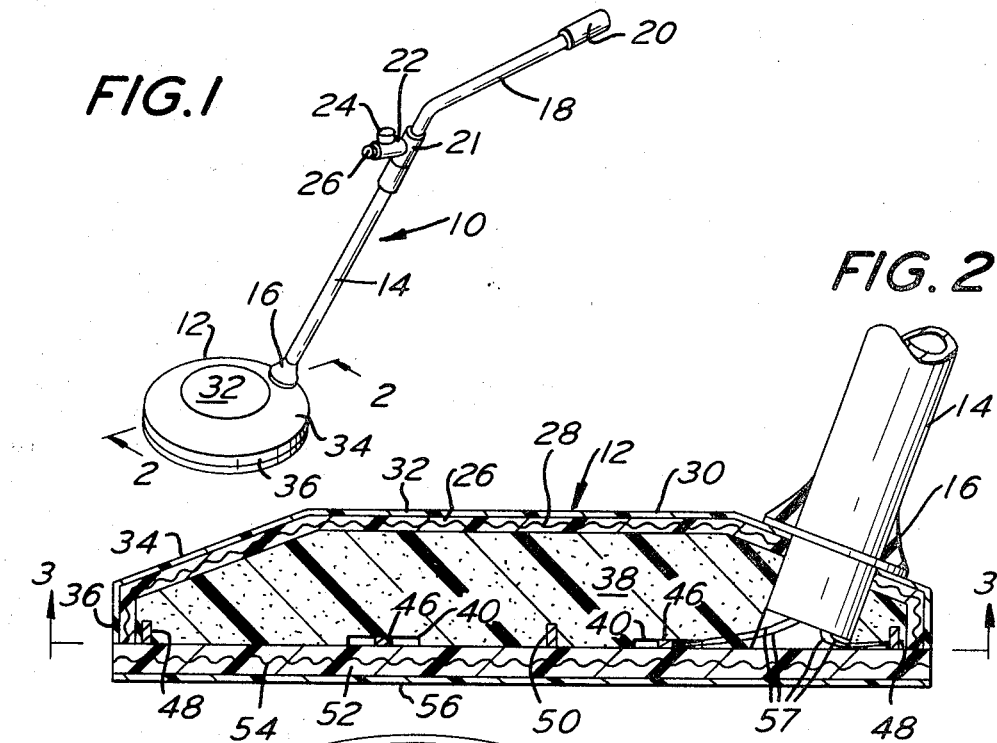
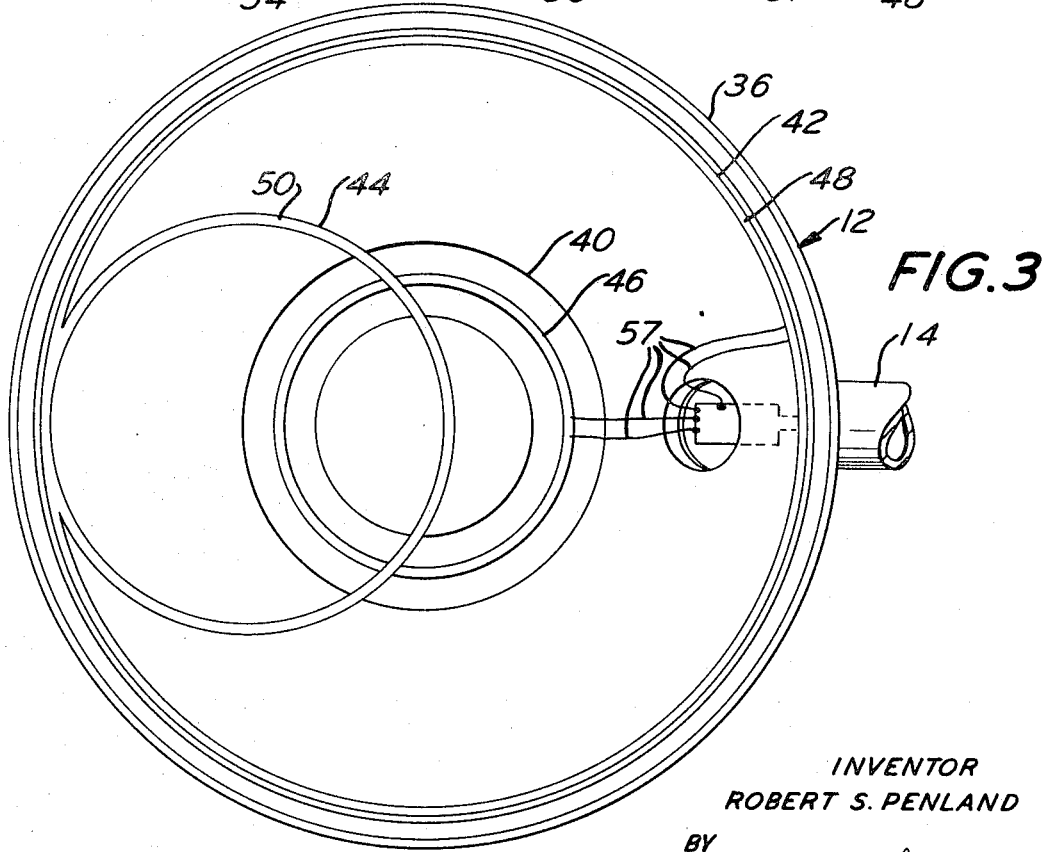
INVENTOR
ROBERT S. PENLAND
BY
Arthur A Jacobs
ATTORNEY Dec. 22, 1970   R. S. PENLAND   3,549,985
METAL DETECTING DEVICE HAVING A DISK-SHAPED HEAD
FOR HOUSING A COIL SYSTEM
Filed Feb. 27, 1969   2 Sheets-Sheet 2
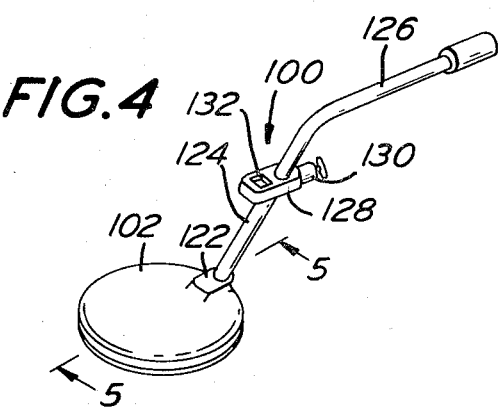
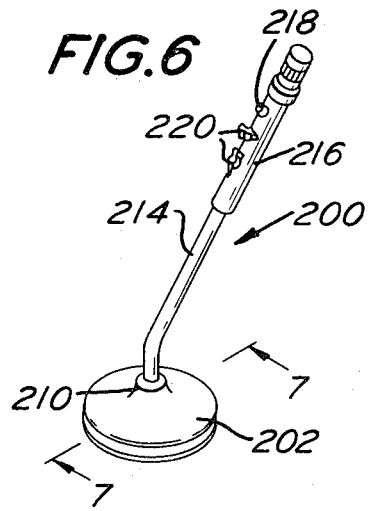
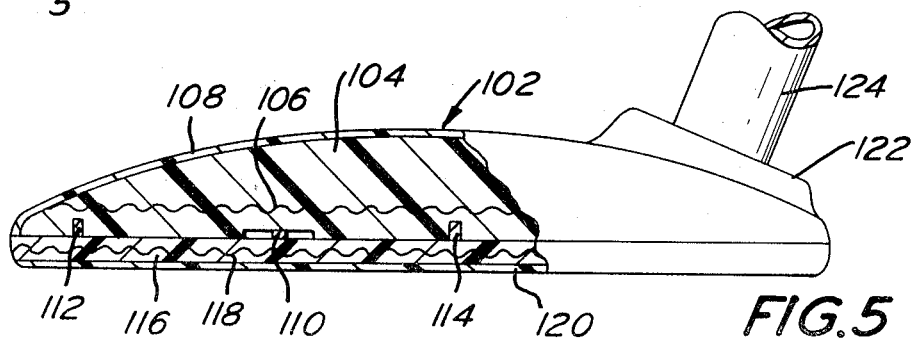
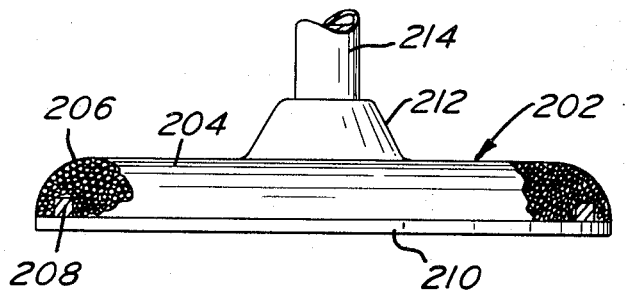
INVENTOR
ROBERT S. PENLAND
BY
Arthur A. Jacobs
ATTORNEY

United States Patent Office 3,549,985
Patented Dec. 22, 1970

3,549,985
METAL DETECTING DEVICE HAVING A DISK-SHAPED HEAD FOR HOUSING A COIL SYSTEM
Robert S. Penland, Northfield, N.J., assignor to Electronic Sensing Products, Inc., Philadelphia, Pa., a corporation of New Jersey
Continuation-in-part of application Ser. No. 692,205, Dec. 20, 1967. This application Feb. 27, 1969, Ser. No. 803,008
Int. Cl. G01v 3/10
U.S. Cl. 324—3                4 Claims

ABSTRACT OF THE DISCLOSURE

An electronic detector device construction which comprises a molded head for coil housing having grooves molded therein to receive electronic coils and having a hardened gel coating on the surface. A hollow handle extends from a socket molded or otherwise connected to the head, and this hollow handle is provided with a micronized electronic circuit wich is connected by wires extending through the handle and connected to the coils in the head.

---

This is a continuation-in-part of copending application Ser. No. 692,205, filed Dec. 20, 1967.

This invention relates to an electronic detection device, and it particularly relates to a device of this type wherein the electrical components are securely and compactly encased within the device.

The detector device embodied herein is adapted to be passed over either land or water, and when it passes over a metal object buried within the ground or under tre water, the electronic circuit within the device produces a signal, either auditory or visual.

An object of the present invention is to provide a detector device which, according to its physical construction, may be used over either land or water without being subjected to either corrosion, rusting or shattering.

Another object of the present invention is to provide a detector device of the aforesaid type which is not affected by changes in temperature or pressure of the atmosphere or other environment in which it is used.

Another object of the present invention is to provide a detector device of the aforesaid type that is easily assembled and disassembled to permit easy and rapid adjustment or replacement of parts.

Another object of the present invention is to provide a detector device of the aforesaid type that is compact, relatively light in weight, and easy to handle.

Other objects and many of the attendant advantages of this invention will be readily appreciated as the same becomes better understood by reference to the following description when read in conjunction with the accompanying drawings wherein:

FIG. 1 is a perspective view of a detector device embodying the present invention which is specially adapted for use on land.

FIG. 2 is an enlarged sectional view taken on line 2—2 of FIG. 1.

FIG. 3 is a sectional view taken on line 3—3 of FIG. 2.

FIG. 4 is a perspective view of a detector device embodying the present invention which is especially adapted for use under water.

FIG. 5 is an enlarged sectional view taken on line 5—5 of FIG. 4.

FIG. 6 is a perspective view of a relatively small and light version of a detector device embodying the present invention which is especially adapted for use as a toy.

FIG. 7 is an enlarged sectional view taken on line 7—7 of FIG. 6.

Referring now in greater detail to the various figures of the drawings wherein similar reference characters refer to similar parts, there is shown in FIG. 1 a detector device, generally designated 10, having a head or coil housing 12 of generally disclike configuration and a hollow cylindrical handle 14 extending up from the housing 12.

The handle 14 may either be made integral with the housing 12 or, preferably, is made separable therefrom and releasably inserted in an aperture at one side of the upper wall of the housing 12 (as shown in FIG. 2). When made separable, the handle 14 is held in place by a plastic sleeve or collar 16 which is bonded by any suitable adhesive to the housing 12 and which frictionally engages the peripheral surface of the handle 14.

The handle 14 is provided with an offset portion 18 at the end of which is provided a cylindrical grip portion 20 made of any desirable frictional material such as rubber, polyethylene, etc. Just below the offset portion 18 is a sleeve 21 from which extends a cylindrical housing 22. within the offset portion 18 is provided a transistorized transmitter-receiver circuit mounted on an etched epoxy glass board with Teflon insulated interconnection wiring. This circuit is not here shown since, by itself, it forms no part of the present invention. The wires are, however, passed through the hollow handle 14 and are connected to the coils, to be hereinafter more fully described, in the housing 12. The housing 22 is provided with a microammeter indicator 24 operatively connected to the detector circuit and with a potentiometer 26 also operatively connected to the circuit.

The housing comprises a rollow body 26 (as best shown in FIG. 2) made of a plastic material such as a polyester resin. Within the resin is embedded a woven fiberglass mat 28. A surface layer 30 of a gel-like substance, such as isophthalic polyester, is provided on the body 26. The housing portion formed by the body 28 and its surface layer 30 may be of any one of various shapes but is preferably provided, as shown, with a central plateau area 32, a downwardly and outwardly inclined peripheral wall 34 and a dependent peripheral skirt 36. The sleeve 16 may, as stated above, either be formed integral with the housing 12 or may be made separately and adhered thereto in the manner shown in the drawings. In either case, it surrounds the aperture in the wall portion 34 which frictionally receives the lower portion of the handle 14 (as best shown in FIG. 2).

Within the hollow of the body 26 is a preformed body 38 made of polyurethane foam and provided with an inner circular groove 40 (as best seen in FIG. 3) and an outer circular groove 42 (also best shown in FIG. 3). The outer groove 42 is provided with an inwardly extending loop portion 44 which overlaps a portion of the inner groove 40. A circular coil 46 is positioned in inner groove 40 and a circular coil 48 is positioned in outer groove 42. An inner loop extension 50 of coil 48 is positioned in groove 44. The body 28 plus the internal mat 28 and the gel surface coating 30 are preferably formed by applying them over the preformed surface of the foam body 38 in molds formed of glass and epoxy-coated metal molds.

The bottom of the housing 12 is formed by a bottom plate 52 also formed of a polyester resin or the like, in which is embedded a fiberglass mat 54, and which is coated at its bottom surface with a layer 56 of a gel such as isophthalic polyester.

In constructing the device, prior to attaching the bottom plate, the coils 46, 48 and 50 are placed in their respective grooves and adhered therein by means of a suitable glue such as one formed from a mixture of polyester and talc. The wires 57 connected to the electronic circuit in the handle 14 are then soldered to the coils 46 and 48.

The bottom plate is made by pouring the gel layer 56 on a glass plate, laying the fiberglass mat 54 on top of it, and then, while the gel is still moist and tacky, pouring the polyester resin 52 thereon. The bottom plate is then, after being dried, bonded to the upper portion to enclose the polyurethane foam body and the coils therebetween, this bonding being preferably effected with these materials at a temperature of about 115° F.

In FIGS. 4 and 5 there is shown a modified form of the invention, generally designated 100. The detector device 100 comprises a head or coil housing 102 which includes a curved body 104 molded from a mixture of polyester resin and talc, and having a fiberglass mat 106 embedded therein. A surface coating of a hardened gel material, such as isophthalic polyester, is provided at 108, in the same manner as in the device of FIGS. 1 and 2.

The body 104 is provided with an inner groove in which is positioned a coil 110, an outer groove in which is positioned a coil 112 and an inwardly extending groove in which is positioned a coil portion 114, similar to the construction shown in the device of FIGS. 1, 2 and 3.

A bottom plate similar to that shown in FIG. 2 is provided in this form of the device, this bottom plate being made in the same manner and consisting of a polyester resin plate 116 having a fiberglass mat 118 embedded therein and a bottom surface coating 120 formed of a hardened gel such as isophthalic polyester or the like.

An angularly extending socket portion 122 is molded integrally with the body 104 and is similarly coated with the hardened gel 108. A hollow handle 124 extends from the socket 122 and is provided with an offset portion 126.

A sealed electronic circuit housing 128 is provided on the handle 124 and is provided with an auxiliary housing 130 containing a potentiometer and the switch for the circuit. A window 132 is provided for viewing the microammeter indicator connected to the circuit, this window being covered by a transparent panel of glass or plastic.

FIGS. 6 and 7 show a relatively small version of the detector device, useful as a toy. This detector device, generally designated 200, is provided with a head or coil housing 202 comprising a molded body 204 consisting of a polyurethane resin filled with glass micro balls, as shown at 206. The balls, which are very small and resemble a powder, are filled with air, and, therefore, serve to considerably lighten the total weight of the head. An annular groove is provided at the undersurface of the body and contains a coil 208. Only a single coil is used in this form of the device, because the electronic circuit used herewith is of the simple beat oscillator type. This type of circuit is not as sensitive as those using the two coils but is sufficient for the purpose of a toy or the like. A bottom plate 210 is adhered to the body 204, the plate 210 being identical in construction to those shown in FIGS. 2 and 5.

A hardened gel outersurface, similar to those used in the detector devices of FIGS. 1 to 5, is also provided on the surface of the body 204 as well as on the surface of an integral socket 212 extending from the center of the upper surface of the body 204.

A hollow handle 214 extends from the socket 212 and this handle is provided with a sleeve 216 which supports a potentiometer knob 218 and switch buttons 220. The micronized circuit is positioned within the hollow handle 214 and is connected by appropriate wiring both to the coil 208 in the head 202 and to the potentiometer 218 and switches 220.

This detector device 200 is a simpler, lighter and smaller version of the detector device and, although not as effective as the other two, can be used to detect metal objects in the ground or otherwise hidden.

The invention claimed is:

1. A metal detecting device comprising a disc-shaped head, said head comprising a hollow molded polymer housing closed by a flat bottom plate, said bottom plate being constructed of a polymer resin and having embedded therein a fiberglass mat, the outer surface of said bottom plate being coated with a hardened polymer gel, said bottom plate having a flat, substantially unindented interior surface, an electronic coil system responsive to a metal object mounted on said flat interior surface of said bottom plate within said housing, a filler substance in said housing, said substance filling the entire interior of said housing but forming interior grooves above said bottom plate, said grooves encompassing said coil system, an elongated hollow handle extending from said head, an electronic circuit in said handle, and an electrical connection between said electronic circuit and said coil system.

2. The detecting device of claim 1 wherein said filler substance is a preformed body constructed of polyurethane foam.

3. The detecting device of claim 1 wherein said filler substance is a preformed body constructed of a mixture of polyester resin and talc.

4. The detecting device of claim 1 wherein said filler substance comprises glass micro balls.

References Cited

UNITED STATES PATENTS

| | | | |
|---|---|---|---|
| 2,451,596 | 10/1948 | Wheeler | 324—3 |
| 2,680,226 | 6/1954 | Whitehead et al. | 324—3 |
| 3,001,105 | 9/1961 | Fox | 174—52.6UX |
| 3,153,694 | 10/1964 | Tomlinson | 174—52(.6) |
| 3,210,457 | 10/1965 | Hancock et al. | 174—52(.6) |
| 3,210,701 | 10/1965 | Fastner et al. | 174—52(.6) |
| 3,290,635 | 12/1966 | Hofmann et al. | 336—96X |
| 3,336,552 | 8/1967 | Davis | 174—52(.6)X |
| 3,377,522 | 4/1968 | Tsuj et al. | 174—52(.6)X |
| 3,467,855 | 9/1969 | Rance | 324—3 |

OTHER REFERENCES

Osborne, W. E.: Transistorized Metal Detector, Electronics World, March 1962, pp. 86–88.

GERARD R. STRECKER, Primary Examiner

U.S. Cl. X.R.

174—52; 336—96